US011190592B2

(12) United States Patent
Lopez

(10) Patent No.: US 11,190,592 B2
(45) Date of Patent: Nov. 30, 2021

(54) COMMUNICATION NETWORK ON BOARD A VEHICLE, SUBSCRIBER DEVICE OF SUCH A COMMUNICATION NETWORK, AND CORRESPONDING METHOD

(71) Applicant: Airbus Operations (S.A.S.), Toulouse (FR)

(72) Inventor: Juan Lopez, Grenade sur Garonne (FR)

(73) Assignee: Airbus Operations (S.A.S.), Toulouse (FR)

( * ) Notice: Subject to any disclaimer, the term of this patent is extended or adjusted under 35 U.S.C. 154(b) by 124 days.

(21) Appl. No.: 16/548,207

(22) Filed: Aug. 22, 2019

(65) Prior Publication Data

US 2020/0076894 A1 Mar. 5, 2020

(30) Foreign Application Priority Data

Sep. 3, 2018 (FR) ...................... 1857887

(51) Int. Cl.
*H04L 12/28* (2006.01)
*H04L 29/08* (2006.01)
*H04L 12/46* (2006.01)

(52) U.S. Cl.
CPC .............. *H04L 67/12* (2013.01); *H04L 12/46* (2013.01)

(58) Field of Classification Search
CPC ...................................... H04L 67/12
See application file for complete search history.

(56) References Cited

U.S. PATENT DOCUMENTS

| 7,362,755 B2* | 4/2008 | Etienne | ................. H04L 49/351 370/218 |
| 8,806,242 B2* | 8/2014 | Yousefi | ................. H04W 28/08 713/320 |
| 9,277,370 B2* | 3/2016 | Addepalli | ........... H04L 43/0876 |
| 2016/0154391 A1* | 6/2016 | Pavaskar | ............. H04L 41/0803 701/3 |
| 2018/0013671 A1* | 1/2018 | Lopez | ..................... H04L 45/66 |
| 2018/0241666 A1* | 8/2018 | Van Stensel | ............ H04L 47/56 |

FOREIGN PATENT DOCUMENTS

| EP | 1 309 131 B1 | 6/2010 |
| WO | WO 2015/012454 A1 | 1/2015 |

OTHER PUBLICATIONS

Land et al., "Architecting ARINC 664, Part 7 (AFDX) Solutions," XILINX, XAPP1130 (v1.0.1), pp. 1-25 (May 22, 2009).

French Search Report for Application No. 1857887 dated May 3, 2019.

* cited by examiner

*Primary Examiner* — Guang W Li
(74) *Attorney, Agent, or Firm* — Jenkins, Wilson, Taylor & Hunt, P.A.

(57) ABSTRACT

A communication network on board a vehicle is a deterministic switched Ethernet network using virtual links, including a set of subscriber devices and a set of switches in which communications are performed redundantly. To manage redundancy, each data frame transmitted on a virtual link includes a frame number in a numbering field of the frame. The transmitter and/or receiver subscriber devices on the virtual link take into account a length of the numbering field equal to a first predetermined length when the BAG value associated with the virtual link is greater than or equal to a predetermined BAG value, otherwise equal to a second predetermined length greater than the first length.

13 Claims, 3 Drawing Sheets

| VL | header | payload data | ... | SN | CRC |

COMMUNICATION NETWORK ON BOARD A VEHICLE, SUBSCRIBER DEVICE OF SUCH A COMMUNICATION NETWORK, AND CORRESPONDING METHOD

CROSS-REFERENCE TO RELATED APPLICATION

This application claims the benefit of and priority to French patent application number 18 57887 filed on Sep. 3, 2018, the entire disclosure of which is incorporated by reference herein.

TECHNICAL FIELD

The disclosure herein relates to the field of communication networks, and more particularly to communication networks on board vehicles, in particular aircraft.

BACKGROUND

Aircraft generally include one or more on-board communication networks intended to allow communications between on-board devices, in particular on-board computers. To meet legal requirements in terms of aircraft certification, an on-board communication network must be deterministic, that is to say it must allow information to be transmitted from a transmitter device subscribed to this communication network to one or more receiver devices subscribed to this communication network, with a transmission duration shorter than a predetermined duration and a guarantee of no loss of information through the network. The ARINC 664 Part 7 standard defines a deterministic on-board avionic communication network, based on a full-duplex Ethernet technology. Such a network may correspond, for example, to an AFDX® communication network. In a network in accordance with the ARINC 664 Part 7 standard, each device subscribed to the communication network is linked to a switch of the network, and the communications between the various devices take predefined virtual links in the definition and the configuration of the network. A virtual link is defined between a transmitter device and one or more receiver devices, via one or more switches of the network. Each virtual link takes a determined path in the network. A bandwidth is allocated to each virtual link, and the various virtual links of the network are routed such that the sum of the bandwidths allocated to the virtual links taking one and the same physical link does not exceed the bandwidth supported by the physical link. This is necessary in order to guarantee the determinism of the network. All communications between devices are defined in advance, through the definition of the virtual links, so as to allow the switches to be configured: each switch includes a configuration table dependent on the virtual links transiting through this switch. The configuration of each switch is downloaded into the switch before it is used. To guarantee sufficient availability of communications between the various devices, the communication network 5 is divided in a redundant manner into two layers A and B, as in the example shown in FIG. 1a: the switches, the physical links and the virtual links are duplicated identically on each of the layers A and B. These two layers A and B thus form two independent elementary networks. The various devices linked to the communication network each include two network interfaces respectively linked to the layers A and B of the communication network. The network shown in the figure thus includes switches 12a, 12b, . . . 12h on the layer A and switches similar thereto, respectively 22a, 22b, . . . 22h, on the layer B. Each of the subscribers 10a, 10b, . . . 10g to the communication network is linked to two similar switches in the two layers A and B: for example, the subscriber 10a is linked to the switches 12a and 22a, the subscriber 10d is linked to the switches 12h and 22h, the subscriber 10e is linked to the switches 12b and 22b, etc. A virtual link VL1, allowing communications from the subscriber 10d to the subscriber 10g, is shown in FIG. 1b. This figure is similar to FIG. 1a, references having been deleted so as to improve legibility. In practice, the virtual link VL1 corresponds to a virtual link $VL1_A$ on the layer A (via the switches 12h and 12g) and to a virtual link $VL1_B$ on the layer B (via the switches 22h and 22g). These two virtual links are identical, with regard both to their characteristics (bandwidth, etc.) and their number VL1. The data frames transmitted on the communication network are thus transmitted redundantly on each of the independent elementary networks corresponding to the layers A and B. To allow redundancy management at reception, a frame number is added to each transmitted data frame, in a numbering field of the transmitted data frame. This frame number is sometimes also called sequence number. Thus, for example, the subscriber 10d transmits each data frame, with the same frame number, both on the virtual link $VL1_A$ and on the virtual link $VL1_B$. The frame number is incremented for each new frame transmitted on the virtual link under consideration. On reception, when the receiver subscriber 10g receives a data frame transmitted on the virtual link VL1 by the subscriber 10d, the subscriber 10g analyses the received data frame so as to identify the numbering field, and it reads the corresponding frame number. If it had not yet received a data frame corresponding to this frame number during a predetermined time interval preceding the reception of the frame, the subscriber 10g accepts the received data frame. If it had already received a data frame corresponding to this frame number during the predetermined time interval, the subscriber 10g rejects the received data frame. Thus, a receiver subscriber accepts only the first received frame out of the two redundant instances of one and the same data frame transmitted on a virtual link. The use of such a frame number to manage the redundancy of the communication network is described for example in patent EP1,309,131 B1 from the applicant. The length of the numbering field used in communication networks in accordance with the ARINC664 Part 7 standard is 8 bits. This length is well-suited to communication networks for which the bit rate of the communications is less than or equal to 100 Mbits/s. On such a communication network, the minimum time interval between the sending of two consecutive frames on one and the same virtual link, called BAG ("bandwidth allocation gap"), is generally chosen from among the following values: 1 ms, 2 ms, 4 ms, 8 ms, 16 ms, 32 ms, 64 ms, 128 ms. The 8 bit-long numbering field makes it possible to code frame number values between 1 and 255. When the frame number reaches 255, the frame number returns to 1 for the following frame. For the smallest BAG value, that is to say 1 ms, one and the same frame number is thus reused every 255 ms. This duration is enough to guarantee satisfactory behavior of the communication network in the event of interference (interfering equipment, lightning, etc.), this interference in practice lasting less than 255 ms.

In the future, it would be desirable to be able to use higher communication bit rates, for example 1 Gbits/s. The value of the BAG for such a bit rate would be chosen from among the following values: 62.5 ρs, 0.125 ms, 0.25 ms, 0.5 ms, 1 ms, 2 ms, 4 ms, 8 ms, 16 ms, 32 ms, 64 ms, 128 ms, 256 ms, 512 ms. For a BAG value equal to 62.5 µs, one and the same frame number would be reused every 15.81 ms (that is to say 255×62.5 µs). Now, interference on the communication network may last several milliseconds, sometimes more than 15.81 ms. This means that redundancy management for the communications would be highly difficult in such a case. There is therefore a need to allow redundancy management for the communications on a communication network comprising virtual links having a bit rate higher than that of current networks, while at the same time guaranteeing cross-compatibility with devices communicating on other virtual links at a conventional bit rate less than or equal to 100 Mbits/s.

SUMMARY

An aim of the present disclosure is in particular to provide a solution to this need. It relates to a communication network on board a vehicle, the communication network being a deterministic switched Ethernet network using virtual links, this communication network comprising:
  at least two independent elementary networks;
  a transmitter subscriber device on one of the virtual links; and
  at least one receiver subscriber device on the virtual link, wherein the transmitter subscriber and the receiver subscriber each comprise a configuration table containing configuration parameters for the virtual link and are furthermore:
    each connected to each of the elementary networks; and
    configured such that, when a data frame is transmitted by the transmitter subscriber to the receiver subscriber on the virtual link:
    the transmitter subscriber adds, to the frame, a numbering field containing a frame number, and sends the frame on each of the elementary networks; and
    the receiver subscriber, when it receives a frame, reads the value of the frame number contained in the numbering field of the received frame, accepts this frame if this value does not correspond to a number of a frame previously received during a time interval, and refuses this frame if this value corresponds to a number of a frame previously received during the time interval.
The communication network is noteworthy in that:
  the transmitter subscriber is configured so as to read, from its configuration table, a BAG value associated with the virtual link and so as to add the numbering field to the frame, depending on a length of the numbering field corresponding to:
  a first predetermined length when the BAG value associated with the virtual link is greater than or equal to a predetermined BAG value; and
  a second predetermined length, greater than the first length, when the BAG value associated with the virtual link is less than this predetermined BAG value, and
  the receiver subscriber is configured so as to read, from its configuration table, a BAG value associated with the virtual link and so as to read the value of the frame number contained in the numbering field of the received frame, depending on a length of the numbering field corresponding to:
  the first predetermined length when the BAG value associated with the virtual link is greater than or equal to the predetermined BAG value; and
  the second predetermined length when the BAG value associated with the virtual link is less than this predetermined BAG value.

Thus, the transmitter subscriber device of the communication network is able to send data frames to the receiver subscriber device on a first virtual link such that the BAG value associated with this first virtual link is less than the predetermined BAG value. The length of the numbering field then corresponds to the second predetermined length. The transmitter subscriber device and the receiver subscriber device may furthermore communicate with other subscribers of the communication network via other virtual links, such that the BAG value associated with these other virtual links is greater than or equal to the predetermined BAG value. The length of the numbering field then corresponds to the first predetermined length, for example equal to 8 bits when the other virtual links have a conventional bit rate less than or equal to 100 Mbits/s. Given that the second predetermined length is greater than the first predetermined length, the maximum possible value for the frame number is higher for the first virtual link than for the other virtual links. This is particularly beneficial when the bit rate of the first virtual link is greater than that of the other virtual links, for example equal to 1 Gbits/s. Specifically, this higher maximum value of the frame number means a longer time interval before one and the same frame number is reused, thereby making it possible to solve the problems from the prior art for BAG values lower than those corresponding to virtual links having a conventional bit rate. The disclosure herein at the same time allows for communication compatibility for the transmitter subscriber and the receiver subscriber with the other subscribers, via the other virtual links for which the length of the numbering field corresponds to the first predetermined length, for example equal to 8 bits.

The disclosure herein also relates to a subscriber device of a communication network on board a vehicle, the communication network being a deterministic switched Ethernet network using virtual links, this communication network comprising:
  at least two independent elementary networks;
  a transmitter subscriber device on one of the virtual links and at least one receiver subscriber device on the virtual link, including the subscriber device of the communication network,
  the subscriber device of the communication network being connected to each of the elementary networks and comprising a configuration table containing configuration parameters for the virtual link,
  the subscriber device of the communication network furthermore being configured such that:
    when it acts as transmitter subscriber during the transmission of a data frame by the transmitter subscriber to the receiver subscriber on the virtual link, the subscriber device of the communication network adds, to the frame, a numbering field containing a frame number, and sends the frame on each of the elementary networks; and
    when it acts as receiver subscriber during the transmission of the data frame by the transmitter subscriber to the receiver subscriber on the virtual link, the subscriber device of the communication network, when it receives a frame, reads the value of the frame number contained in the numbering field of the received frame, accepts this frame if this value does not correspond to a number of a frame previously received during a time interval, and refuses this frame if this value corresponds to a number of a frame previously received during the time interval.

The subscriber device of the communication network is noteworthy in that:

when it acts as transmitter subscriber during the transmission of a data frame by the transmitter subscriber to the receiver subscriber on the virtual link, the subscriber device of the communication network is configured so as to read, from its configuration table, a BAG value associated with the virtual link, and so as to add the numbering field to the frame, depending on a length of the numbering field corresponding to:

a first predetermined length when the BAG value associated with the virtual link is greater than or equal to a predetermined BAG value; and a second predetermined length, greater than the first length, when the BAG value associated with the virtual link is less than this predetermined BAG value, and/or when it acts as receiver subscriber during the transmission of the data frame by the transmitter subscriber to the receiver subscriber on the virtual link, the subscriber device of the communication network is configured so as to read, from its configuration table, a BAG value associated with the virtual link, and so as to read the value of the frame number contained in the numbering field of the received frame, depending on a length of the numbering field corresponding to:

the first predetermined length when the BAG value associated with the virtual link is greater than or equal to the predetermined BAG value; and the second predetermined length when the BAG value associated with the virtual link is less than this predetermined BAG value.

The disclosure herein also relates to a communication method in a vehicle comprising an on-board communication network of deterministic switched Ethernet network type using virtual links, this communication network comprising:

at least two independent elementary networks;

a transmitter subscriber device on one of the virtual links and at least one receiver subscriber device on the virtual link, the transmitter subscriber and the receiver subscriber each being connected to each of the elementary networks and each comprising a configuration table containing configuration parameters for the virtual link, the method comprising a step of transmission of a data frame by the transmitter subscriber to the receiver subscriber on the virtual link, this transmission step comprising the following sub-steps implemented by the transmitter subscriber:

adding, to the frame, a numbering field containing a frame number; and sending the frame on each of the elementary networks, and a sub-step of reception of a frame by the receiver subscriber, during which the receiver subscriber reads the value of the frame number contained in the numbering field of the received frame, accepts this frame if this value does not correspond to a number of a frame previously received during a time interval, and refuses this frame if this value corresponds to a number of a frame previously received during the time interval.

The method is noteworthy in that:

the sub-step of adding, to the frame, by the transmitter subscriber, a numbering field containing the frame number comprises reading, by the transmitter subscriber, from its configuration table, a BAG value associated with the virtual link, the addition of the numbering field to the frame being performed depending on the length of the numbering field corresponding to:

a first predetermined length when the BAG value associated with the virtual link is greater than or equal to a predetermined BAG value; and a second predetermined length, greater than the first length, when the BAG value associated with the virtual link is less than this predetermined BAG value, and in that:

the sub-step of reception of a frame by the receiver subscriber comprises reading, by the receiver subscriber, from its configuration table, a BAG value associated with the virtual link, the reading, by the receiver subscriber, of the value of the frame number contained in the numbering field of the received frame being performed depending on a length of the numbering field corresponding to:

the first predetermined length when the BAG value associated with the virtual link is greater than or equal to the predetermined BAG value; and the second predetermined length when the BAG value associated with the virtual link is less than this predetermined BAG value.

According to particular embodiments, which may be combined with one another:

the first predetermined length is equal to 8 bits;

the predetermined BAG value is chosen within the interval [0.1 ms; 1 ms], preferably within the interval [0.5 ms; 1 ms];

the second predetermined length is chosen within the interval [10 bits; 32 bits], preferably within the interval [16 bits; 32 bits], in particular equal to 32 bits.

The disclosure herein also relates to a vehicle, in particular an aircraft, including a communication network as mentioned above.

BRIEF DESCRIPTION OF THE DRAWINGS

The disclosure herein will be better understood on reading the following description and on examining the appended figures.

DETAILED DESCRIPTION

Figure 1A:
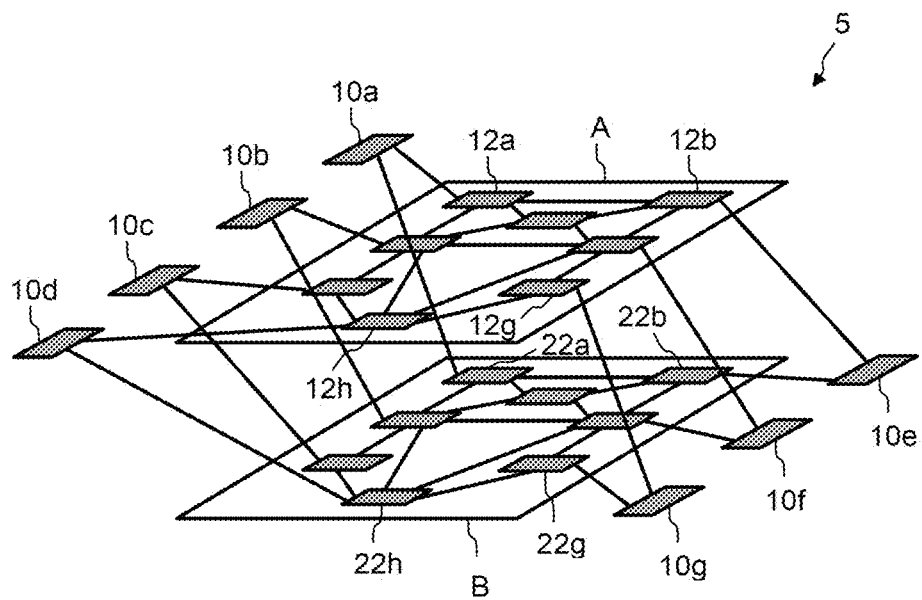
FIGS. 1a and 1b, already described, illustrate, in simplified form, an example of a deterministic switched Ethernet communication network using virtual links.
Figure 1B:
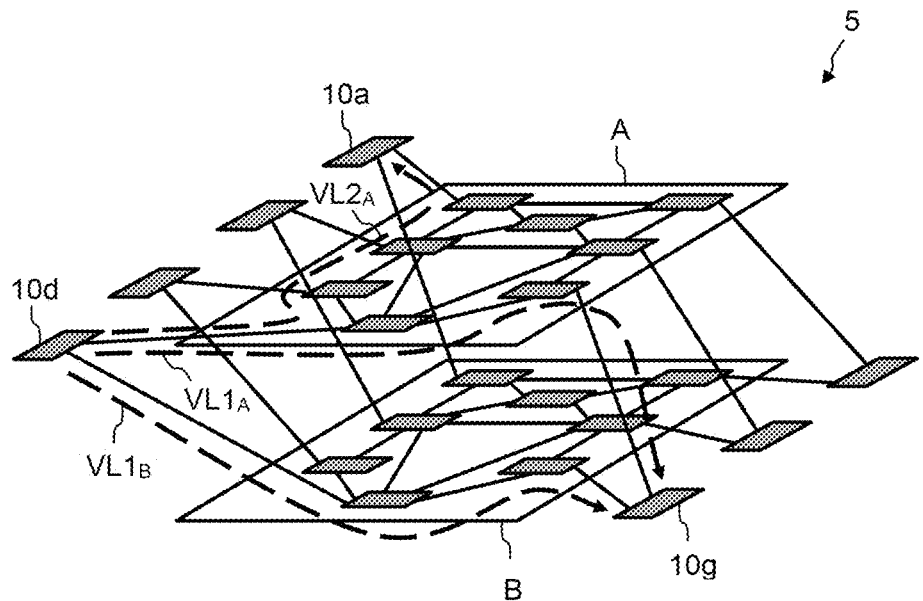

The communication network 5 shown in FIGS. 1a and 1b comprises two independent elementary networks. In the example shown in the figures, a first of the independent elementary networks is illustrated by a layer A and the second of the independent elementary networks is illustrated by a layer B of the communication network 5. The first elementary network (layer A) includes a set of switches 12a, 12b ... 12h, and a set of physical links each defined between two switches of the set of switches. Similarly, the second elementary network (layer B) includes a set of switches 22a, 22b ... 22h, and a set of physical links each defined between two switches of the set of switches. The communication network also includes a set of subscriber devices 10a, 10b ... 10g, each linked to a switch of the first elementary network and to a switch of the second elementary network. A subscriber device 10d is a transmitter on a virtual link VL1. At least one subscriber device 10g is a receiver on the virtual link VL1. The virtual link VL1 is implemented by way of two instances $VL1_A$ and $VL1_B$ of the virtual link, the instance $VL1_A$ passing through the first elementary network (layer A) and the instance $VL1_B$ passing through the second elementary network (layer B).

Figure 2:
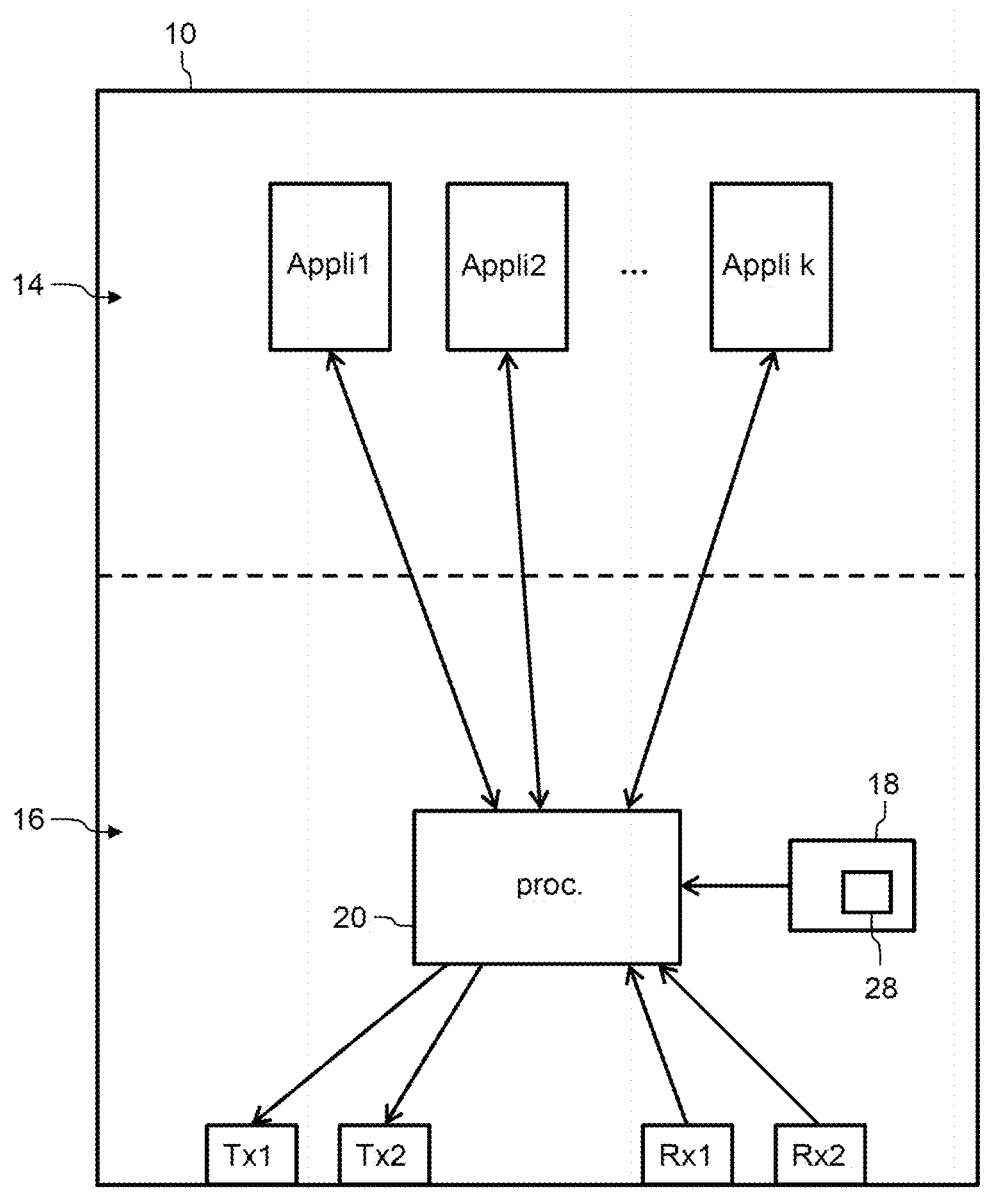
FIG. 2 schematically shows a subscriber of the communication network.

The functional architecture of a generic subscriber 10, corresponding to any one of the subscribers 10a, 10b ... 10g of the communication network, is illustrated by FIG. 2. The subscriber 10 includes an application portion 14 and a network interface portion 16 (also called "end user"). The application portion comprises a set of applications appli1, appli2 ... appli k. The network interface portion 16 comprises a processing unit 20 (labelled "proc" in the figure), linked to a configuration memory 18. This configuration memory contains for example one or more configuration tables 28. The network interface portion 16 furthermore comprises two transmission communication ports Tx1 and Tx2 for transmission to the communication network, and two reception communication ports Rx1 and Rx2 for reception from the communication network. The processing unit 20 is linked to the two transmission communication ports Tx1 and Tx2 and to the two reception communication ports Rx1 and Rx2. When the subscriber 10 is connected to the communication network and corresponds for example to one of the abovementioned subscribers 10a, 10b ... 10g, the port Tx1 is linked to a switch of the first elementary network, on the one hand, and the port Tx2 is linked to another switch of the second elementary network, on the other hand, thereby enabling two redundant and segregated links between the subscriber 10 and other subscribers, via these two switches and the communication network. Similarly, the port Rx1 is linked to this switch of the first elementary network, on the one hand, and the port Rx2 is linked to this other switch of the second elementary network, on the other hand. The processing unit 20 implements a communications manager configured so as to firstly send data frames corresponding to data received from the applications appli1, appli2 ... appli k on the two communication ports Tx1 and Tx2, and secondly send these applications data corresponding to data frames received on the communication ports Rx1 and Rx2.

During operation, when the subscriber 10 acts as transmitter, during the sending of a data frame redundantly on the ports Tx1 and Tx2, the processing unit 20 adds a frame number to a numbering field of the frame, so as to allow redundancy management by a receiver subscriber. When the subscriber 10 acts as receiver, during the reception of a frame on one of the ports Rx1 or Rx2, the processing unit 20 reads the value of the frame number contained in the numbering field of the received frame. The processing unit 20 accepts this frame if this value does not correspond to a number of a frame previously received during a time interval preceding the reception of the frame, and refuses this frame if this value corresponds to a number of a frame previously received during the time interval. Thus, a receiver of the communication network accepts only the first out of two redundant frames received on a virtual link, thereby allowing redundancy management. A possible value of the time interval is for example 65.535 ms (that is to say $2^{16}$ microseconds).

Figures 3, 4:
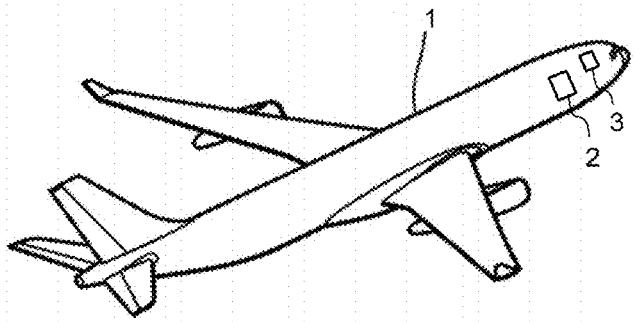
FIG. 3 illustrates a data frame intended to be exchanged on a virtual link of a deterministic switched Ethernet communication network.
FIG. 4 shows an aircraft comprising a communication network according to one embodiment of the disclosure herein.

An example of a data frame exchanged on a virtual link between a transmitter subscriber and a receiver subscriber is illustrated in FIG. 3. This data frame 24 comprises in particular the number of the virtual link VL, header information, payload data, a numbering field SN and a control field corresponding for example to a cyclic redundancy code CRC.

The configuration memory 18 comprises at least one configuration table 28 containing information in relation to the various virtual links for which the subscriber 10 is the transmitter or receiver. Among this information, for each of the virtual links, the configuration table contains a BAG value associated with this virtual link. As indicated above, the BAG ("bandwidth allocation gap") corresponds to the minimum time interval between the sending of two consecutive frames on one and the same virtual link.

According to one embodiment of the disclosure herein, when the subscriber 10 acts as transmitter on a virtual link, during the sending of a data frame, the processing unit 20 of the subscriber reads, from the configuration table of the memory 18, a BAG value associated with the virtual link. The processing unit 20 adds the numbering field to the data frame, depending on a length of the numbering field corresponding to:
a first predetermined length when the BAG value associated with the virtual link is greater than or equal to a predetermined BAG value; and
a second predetermined length, greater than the first length, when the BAG value associated with the virtual link is less than this predetermined BAG value.

When the subscriber 10 acts as receiver on a virtual link, during the reception of a data frame, the processing unit 20 of the subscriber reads, from the configuration table of the memory 18, a BAG value associated with the virtual link. The processing unit 20 reads the value of the frame number contained in the numbering field of the received frame, depending on a length of the numbering field corresponding to:
the first predetermined length when the BAG value associated with the virtual link is greater than or equal to the predetermined BAG value; and
the second predetermined length when the BAG value associated with the virtual link is less than this predetermined BAG value.

In one embodiment, the first predetermined length is equal to 8 bits, this corresponding to the length of the numbering field used conventionally in communication networks having a conventional bit rate less than or equal to 100 Mbits/s.

In one particular embodiment, the predetermined BAG value is chosen within the interval [0.1 ms; 1 ms], preferably within the interval [0.5 ms; 1 ms]; Therefore, when the bit rate on the virtual link under consideration corresponds to a conventional bit rate less than or equal to 100 Mbits/s, for which the possible BAG values range from 1 ms to 512 ms as indicated above, the value of the BAG for the virtual link under consideration is greater than or equal to the predetermined BAG value. The result of this is that the subscriber device 10, when it acts as transmitter, will transmit a data frame on the virtual link with a length of the numbering field equal to the first predetermined length, for example 8 bits, which corresponds to the length of the numbering field in a communication network having a conventional bit rate less than or equal to 100 Mbits/s. Similarly, when the subscriber device 10 acts as receiver, it reads the number of a received frame, considering the length of the numbering field to be equal to the first predetermined length, for example 8 bits.

When the bit rate on the virtual link under consideration corresponds to a higher bit rate, for example 1 Gbits/s, possible BAG values range in particular from 62.5 µs to 0.125 ms as indicated above: such values of the BAG for the virtual link under consideration are less than the predetermined BAG value. The result of this is that the subscriber device 10, when it acts as transmitter, will transmit a data frame on the virtual link with a length of the numbering field equal to the second predetermined length. Similarly, when the subscriber device 10 acts as receiver, it reads the number of a received frame, considering the length of the numbering field to be equal to the second predetermined length.

Advantageously, the second predetermined length is chosen within the interval [10 bits; 32 bits], preferably within the interval [16 bits; 32 bits], in particular equal to 32 bits. Such a length of 32 bits has the advantage of being easy to manipulate using modern processors. As the second predetermined length is greater than the first predetermined length, it makes it possible to achieve a sufficient time interval between two consecutive instances of one and the same frame number on a virtual link, even at a bit rate of 1 Gbits/s.

Given that the numbering field length is dependent on the value of the BAG for the virtual link under consideration, one and the same subscriber device of the communication network is able to communicate (as transmitter or as receiver) both at a bit rate of 1 Gbits/s on a first virtual link with at least one other device also intended to communicate at such a bit rate and at a conventional bit rate less than or equal to 100 Mbits/s on a second virtual link with at least one other device that may be intended to communicate only at such a conventional bit rate. This has the advantage of being able to use, in one and the same communication network, both devices according to embodiments of the disclosure herein and pre-existing devices intended to communicate only at a conventional bit rate: the communication network is then configured such that virtual links linking only compatible subscriber devices at a higher bit rate, for example 1 Gbits/s, are configured so as to use such a higher bit rate; virtual links linking subscriber devices among which at least one subscriber device is compatible only with a conventional bit rate are themselves configured so as to use a conventional bit rate less than or equal to 100 Mbits/s. This thus allows communications at a bit rate higher than conventional bit rates, between compatible subscriber devices, while at the same time keeping compatibility with pre-existing devices that are intended only for a conventional bit rate. In the example shown in FIG. 1b, the devices 10d and 10g are in accordance with one embodiment of the disclosure herein: they are therefore able to communicate with one another on the virtual link VL1 (formed by the virtual links $VL1_A$ and $VL1_B$) at a bit rate higher than the conventional bit rate, for example a bit rate of 1 Gbits/s. The bit rate values and BAG values for this virtual link are configured in the configuration tables of the devices. The subscriber device 10a is itself a pre-existing device, intended to communicate only at a conventional bit rate. It is linked to the subscriber device 10d by a virtual link VL2 (formed similarly by two virtual links $VL2_A$ and $VL2_B$ on the two elementary networks, only the virtual link $VL2_A$ being shown for the sake of clarity in the figure). Given that the subscriber device 10a is able to communicate only at a conventional bit rate, the configuration tables of the subscriber devices 10a and 10d are configured with bit rate values and BAG values for the virtual link VL2 corresponding to a conventional bit rate less than or equal to 100 Mbits/s.

According to one embodiment, the various subscriber devices 10a, 10b . . . 10g are configured so as to communicate on the communication network in accordance with a communication protocol compatible with the ARINC 664 Part 7 standard.

The disclosure herein also relates to a vehicle, in particular an aircraft 1 as shown in FIG. 4, implementing a communication network 5 as mentioned above. The subscriber devices and the switches are for example located in an avionics hold 2 close to the cockpit 3 of the aircraft.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A communication network on board a vehicle, the communication network being a deterministic switched Ethernet network using virtual links, the communication network comprising:
   at least two independent elementary networks;
   a transmitter subscriber device on one of the virtual links; and
   at least one receiver subscriber device on the virtual link,
   wherein the transmitter subscriber and the receiver subscriber each comprise a configuration table containing configuration parameters for the virtual link and are:
      each connected to each of the elementary networks; and
      configured such that, when a data frame is transmitted by the transmitter subscriber to the receiver subscriber on the virtual link:
         the transmitter subscriber adds, to the data frame, a numbering field containing a frame number, and sends the data frame on each of the elementary networks; and
         the receiver subscriber, when the receiver subscriber receives the data frame, reads a value of the frame number contained in the numbering field of the data frame received, and either accepts the data frame in a condition that the value does not correspond to a number of a previous frame received during a time interval, or refuses the data frame in a condition that the value corresponds to the number of the previous frame received during the time interval, and wherein:

the transmitter subscriber is configured to read, from the configuration table of the transmitter subscriber, a bandwidth allocation cap (BAG) value associated with the virtual link and to add the numbering field to the data frame, depending on a length of the numbering field corresponding to:
- a first predetermined length when the BAG value associated with the virtual link is greater than or equal to a predetermined BAG value; and
- a second predetermined length, greater than the first length, when the BAG value associated with the virtual link is less than the predetermined BAG value, and the receiver subscriber is configured to read, from the configuration table of the receiver subscriber, a BAG value associated with the virtual link and to read a value of the frame number contained in the numbering field of the data frame received, depending on a length of the numbering field corresponding to:
- the first predetermined length when the BAG value associated with the virtual link is greater than or equal to the predetermined BAG value; and
- the second predetermined length when the BAG value associated with the virtual link is less than the predetermined BAG value.

2. The communication network according to claim 1, wherein the first predetermined length is equal to 8 bits.

3. The communication network according to claim 2, wherein the predetermined BAG value is within an interval range of 0.1 ms to 1 ms, or within an interval range of 0.5 ms to 1 ms.

4. The communication network according to claim 2, wherein the second predetermined length is within an interval range of 10 bits to 32 bits, or within an interval range of 16 bits to 32 bits, in particular equal to 32 bits.

5. A vehicle or an aircraft comprising a communication network according to claim 1.

6. The vehicle or aircraft according to claim 5, wherein the first predetermined length is equal to 8 bits.

7. The vehicle or aircraft according to claim 6, wherein the predetermined BAG value is within an interval range of 0.1 ms to 1 ms, or within an interval range of 0.5 ms to 1 ms.

8. The vehicle or aircraft according to claim 6, wherein the second predetermined length is within an interval range of 10 bits to 32 bits, or within an interval range of 16 bits to 32 bits, in particular equal to 32 bits.

9. A subscriber device of a communication network on board a vehicle, the communication network being a deterministic switched Ethernet network using virtual links, the communication network comprising:
- at least two independent elementary networks;
- a transmitter subscriber device on one of the virtual links and at least one receiver subscriber device on the virtual link, including the subscriber device of the communication network,
- the subscriber device of the communication network being connected to each of the elementary networks and comprising a configuration table containing configuration parameters for the virtual link, the subscriber device of the communication network being configured such that:
- when the subscriber device acts as transmitter subscriber during transmission of a data frame by the transmitter subscriber to the receiver subscriber on the virtual link, the subscriber device of the communication network adds, to the data frame, a numbering field containing a frame number, and sends the data frame on each of the elementary networks; and
- when the subscriber device acts as receiver subscriber during transmission of the data frame by the transmitter subscriber to the receiver subscriber on the virtual link, the subscriber device of the communication network, when the subscriber device receives the data frame, reads a value of the frame number contained in the numbering field of the data frame received, and either accepts the data frame in a condition that the value does not correspond to a number of a previous frame previously received during a time interval, or refuses the data frame in a condition that the value corresponds to the number of the previous frame received during the time interval, wherein:

when the subscriber device acts as transmitter subscriber during transmission of the data frame by the transmitter subscriber to the receiver subscriber on the virtual link, the subscriber device of the communication network is configured to read, from the configuration table of the subscriber device, a bandwidth allocation dap (BAG) value associated with the virtual link, and to add the numbering field to the data frame, depending on a length of the numbering field corresponding to:
- a first predetermined length when the BAG value associated with the virtual link is greater than or equal to a predetermined BAG value; and
- a second predetermined length, greater than the first length, when the BAG value associated with the virtual link is less than the predetermined BAG value, and/or when the subscriber device acts as receiver subscriber during transmission of the data frame by the transmitter subscriber to the receiver subscriber on the virtual link, the subscriber device of the communication network is configured to read, from the configuration table of the subscriber device, a BAG value associated with the virtual link, and to read a value of the frame number contained in the numbering field of the data frame received, depending on a length of the numbering field corresponding to:
- the first predetermined length when the BAG value associated with the virtual link is greater than or equal to the predetermined BAG value; and
- the second predetermined length when the BAG value associated with the virtual link is less than the predetermined BAG value.

10. The subscriber device of a communication network according to claim 9, wherein the first predetermined length is equal to 8 bits.

11. The subscriber device of a communication network according to claim 10, wherein the predetermined BAG value is within an interval range of 0.1 ms to 1 ms, or within an interval range of 0.5 ms to 1 ms.

12. The subscriber device of a communication network according to claim 10, wherein the second predetermined length is chosen within an interval range of 10 bits to 32 bits, or within an interval range of 16 bits to 32 bits, in particular equal to 32 bits.

13. A communication method in a vehicle comprising an on-board communication network of deterministic switched Ethernet network type using virtual links, the communication network comprising:

at least two independent elementary networks;

a transmitter subscriber device on one of the virtual links and at least one receiver subscriber device on the virtual link, the transmitter subscriber and the receiver subscriber each being connected to each of the elementary networks and each comprising a configuration table containing configuration parameters for the virtual link, the method comprising a step of transmission of a data frame by the transmitter subscriber to the receiver subscriber on the virtual link, the transmission step comprising sub-steps implemented by the transmitter subscriber, the sub-steps comprising:

adding, to the data frame, a numbering field containing a frame number; and sending the data frame on each of the elementary networks, and a sub-step of reception of the data frame by the receiver subscriber, during which the receiver subscriber reads a value of the frame number contained in the numbering field of the data frame received, and either accepts the data frame in a condition that the value does not correspond to a number of a previous frame received during a time interval, or refuses the data frame in a condition that the value corresponds to the number of the previous frame received during the time interval, wherein:

the sub-step of adding, to the data frame, by the transmitter subscriber, a numbering field containing the frame number comprises reading, by the transmitter subscriber, from the configuration table of the transmitter subscriber, a bandwidth allocation gap (BAG) value associated with the virtual link, an addition of the numbering field to the data frame being performed depending on a length of the numbering field corresponding to:

a first predetermined length when the BAG value associated with the virtual link is greater than or equal to a predetermined BAG value; and a second predetermined length, greater than the first length, when the BAG value associated with the virtual link is less than the predetermined BAG value, and wherein:

the sub-step of reception of the data frame by the receiver subscriber comprises reading, by the receiver subscriber, from the configuration table of the receiver subscriber, a BAG value associated with the virtual link, the reading, by the receiver subscriber, of the value of the frame number contained in the numbering field of the data frame received being performed depending on a length of the numbering field corresponding to:

the first predetermined length when the BAG value associated with the virtual link is greater than or equal to the predetermined BAG value; and the second predetermined length when the BAG value associated with the virtual link is less than the predetermined BAG value.

* * * * *

UNITED STATES PATENT AND TRADEMARK OFFICE
CERTIFICATE OF CORRECTION

PATENT NO. : 11,190,592 B2
APPLICATION NO. : 16/548207
DATED : November 30, 2021
INVENTOR(S) : Lopez Page 1 of 1

It is certified that error appears in the above-identified patent and that said Letters Patent is hereby corrected as shown below:

In the Claims

Column 11, Line 10, "bandwidth allocation cap" should read "bandwidth allocation gap".

Column 12, Line 29, "dap" should read "gap".

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*